(12) United States Patent
Chouly et al.

(10) Patent No.: US 9,288,393 B2
(45) Date of Patent: Mar. 15, 2016

(54) ESTIMATION OF PICTURE MOTION BLURRINESS

(75) Inventors: Antoine Chouly, Paris (FR); Estelle Lesellier, Meudon (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 152 days.

(21) Appl. No.: 14/113,447

(22) PCT Filed: Apr. 30, 2012

(86) PCT No.: PCT/EP2012/057915
§ 371 (c)(1),
(2), (4) Date: Feb. 4, 2014

(87) PCT Pub. No.: WO2012/150214
PCT Pub. Date: Nov. 8, 2012

(65) Prior Publication Data
US 2014/0132784 A1 May 15, 2014

Related U.S. Application Data

(60) Provisional application No. 61/486,863, filed on May 17, 2011.

(30) Foreign Application Priority Data

May 3, 2011 (EP) .................................... 11305525

(51) Int. Cl.
*H04N 5/232* (2006.01)
*G06T 5/00* (2006.01)
*G06T 7/20* (2006.01)

(52) U.S. Cl.
CPC ............ *H04N 5/23254* (2013.01); *G06T 5/003* (2013.01); *G06T 7/20* (2013.01); *G06T 2207/10016* (2013.01); *G06T 2207/20201* (2013.01); *G06T 2207/30241* (2013.01)

(58) Field of Classification Search
CPC .................................................. H04N 5/23254
USPC ...................................................... 348/208.14
See application file for complete search history.

(56) References Cited

U.S. PATENT DOCUMENTS 5,450,126 A * 9/1995 Nishida ................. G06T 7/2013
348/207.99
5,875,267 A * 2/1999 Djakovic .................. G06T 5/20
382/263

(Continued)

FOREIGN PATENT DOCUMENTS

EP   1 117 251 A1   7/2001

OTHER PUBLICATIONS

International Search Report and Written Opinion issued in corresponding International application No. PCT/EP2012/057915, date of mailing Aug. 7, 2012.

*Primary Examiner* — James Hannett
(74) *Attorney, Agent, or Firm* — Patent Portfolio Builders PLLC (57) ABSTRACT

The invention relates to a method for estimating a blurriness value based on a series of at least two frames acquired within a period of time greater than or equal to a given exposure time, the frames being grouped in at least one couple of frames, characterized in that it comprises determining, for each couple of frames of the series, first and second values corresponding to a displacement according to a first direction and a second direction, between the first frame and the second frame of a couple of frames, determining a first blur measure for one direction among the first and second directions by calculating a metric based on the displacement values for each couple of frames of at least a subset of the series, determining a second blur measure for the other direction among the first and second directions by calculating a metric applied to the displacement values for each couple of frames of the series of frames and determining a blurriness value based on the first and second blur measures.

15 Claims, 3 Drawing Sheets

(56) References Cited

U.S. PATENT DOCUMENTS

| | | | | |
|---|---|---|---|---|
| 6,100,927 | A * | 8/2000 | Ogino | G06T 3/40 348/169 |
| 8,625,926 | B1 * | 1/2014 | Aldrich | H04N 5/23254 348/208.1 |
| 2006/0098237 | A1 | 5/2006 | Steinberg et al. | |
| 2006/0119710 | A1 | 6/2006 | Ben-Ezra et al. | |
| 2007/0065130 | A1 * | 3/2007 | Fukumoto | H04N 5/23264 396/55 |
| 2007/0165961 | A1 * | 7/2007 | Lu | G06T 5/50 382/254 |
| 2008/0137978 | A1 * | 6/2008 | Fu | H04N 5/23254 382/255 |
| 2008/0259170 | A1 | 10/2008 | Hatanaka | |
| 2009/0225174 | A1 * | 9/2009 | Handa | H04N 5/23248 348/208.3 |
| 2010/0026827 | A1 * | 2/2010 | Kobayashi | G06T 7/2053 348/222.1 |

* cited by examiner

ESTIMATION OF PICTURE MOTION BLURRINESS

TECHNICAL FIELD

The present invention generally relates to estimation of a blurriness value in a picture based on an acquired series of frames.

It finds applications, in particular, in video and photo acquisition devices such as camera or phone camera for example.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Motion blur is a critical artefact frequently found in analogical or digital photos. For static or quasi-static scenes, motion blur is typically global and it is due to a noticeable handheld camera motion (also called "jitter") during the acquisition of a picture/frame (e.g. still picture/photo, "video frame") by a user and particularly during a photo exposure time. The degree of motion blur in a picture depends on several factors, as for example camera speed and trajectory, which are themselves dependent on the user skill or situation (walking or sitting in a car for example), on camera settings such as focal length, on the sensor pixel pitch or on the camera weight. Furthermore, moving objects can also induce local motion blur into the picture. Blur results in a significant decrease of the quality of photo and/or video acquisition. Detecting or estimating blur may allow compensating for it, so as to (at least partially) cancel it.

Conventional blur detection/estimation methods are often based on single-frame processing and are thus a posteriori methods which estimate (global or local) picture sharpness via high-pass image filters.

Another way to perform global blur estimation may rely on mechanical devices such as gyroscopes or accelerometers. However, these devices are generally coupled to high-end motion blur compensation techniques (based on optic group or sensor displacement), which are expensive and thus not acceptable for cheaper acquisition devices such as e.g. the majority of phone cameras.

Multi-frames solutions comprise initially monitoring a camera displacement to acquire video or multiple photos, to obtain camera displacement information by jitter extraction on the acquired video and then applying a scale factor to convert the blur trajectory from a video resolution to a photo resolution. However, accuracy of such techniques depends on spatial and temporal resolution of the acquired video. More precisely, these techniques generally rely on the assumption that a temporal interval between the acquired frames is held constant. Moreover, to perform accurate blur estimation for an exposure time, these techniques generally require a very high frame rate in camera displacement monitored by jitter extraction, which is typically cumbersome (if not impossible) to achieve in standard cameras or phone cameras.

For example, the document EP1117251A1 discloses a method for stabilizing a moving image formed using a sequence of successive frames which includes calculating a motion vector field between adjacent frames.

Embodiments of the invention improve the accuracy of detection of blurriness. Thus, acquiring sharpness of a resulting picture is facilitated.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods and devices for blur estimation.

A first aspect of the present invention relates to a method for estimating a blurriness value based on a series of at least two frames acquired within a period of time greater than or equal to a given exposure time, the frames being grouped in at least one couple of frames, the method comprising:
  determining, for each couple of frames of the series, first and second displacement values corresponding to a displacement according to a first direction and a second direction, between the first frame and the second frame of a couple of frames;
  determining a first blur measure for one direction among the first and second directions by calculating a metric based on the displacement values for each couple of frames of at least a subset of the series;
  determining a second blur measure for the other direction among the first and second directions by calculating a metric applied to the displacement values for each couple of frames of the series of frames; and
  determining a blurriness value based on the first and second blur measures.

Each couple of frames may comprise consecutive frames or frames separated by other frames in between.

The displacement values can be obtained by jitter extraction for example. The method enables, in case of video acquisition for example, estimating a blurriness value during a defined time, which is greater than or equal to exposure time, assuming variable jitter information rate, which is a realistic use case.

This enables to improve the accuracy of the estimation of blurriness value by taking into account displacements values according to both first and second directions. Thus, the blurriness value is typically close to real motion blur, which enables to compensate blur and determine efficiently an optimal exposure time or determine the sharpest still image picture among a series of still pictures acquired in burst mode for example.

In some embodiments of the invention, the blurriness value is determined as being one of:
  a greatest value among the first blur measure and the second blur measure;
  an average value of the first blur measure and the second blur measure;
  a weighted average value of the first blur measure and the second blur measure; and
  a weighted sum of a greatest value among the first blur measure and the second blur measure and an average value of the first blur measure and the second blur measure.

Such embodiments enable to obtain a blurriness value representative of a real motion without adding additional calculations.

In some embodiments of the invention, an inter-frame duration is associated to each couple of frames of the series, the inter-frame duration is defined by the interval of time between the acquisitions of a first frame and a second frame of the couple of frames (where the time between frames is defined as the time between the same event in relation to the respective frame, e.g. the time form start of acquisition of the first frame and the start of acquisition of the second frame) and the displacement values for each couple of frames of at least the subset of the series of frames are weighted by the inter-frame duration of the couple of frames to determine at least the first blur measure. The same weighted metric can be applied to determine the second blur measure.

Such embodiments enable to determine a blurriness value by taking into account the inter-frame duration of each frame that has been previously acquired.

The method of EP1117251A1 does not take into account the instantaneous speed between consecutive frames along the trajectory, which is not compatible with a standard medium (from 15 frames per second to 30 frames per second) frame rate in order to model finely the blur effect, and thus to efficiently compensate for the blur. Indeed, the visual effect of the blur is not identical at low speed and at high speed.

Thus, such embodiments of the invention enable to introduce a dynamic aspect in the determination of the blur effect. Furthermore, the blurriness estimation can be processed for a standard frame rate, insofar as the inter-frame durations are taken into account and enable to obtain a sharp estimation for both low and high motion speeds. Moreover, the method provides a reliable blur estimation by taking into account both an inter-frame trajectory and an average motion speed along this trajectory. For example, the trajectory between two successive frames can be considered as being uniform and can thus be represented as a segment.

Exposure time may also be considered as a parameter. Thus, the method can be performed for different exposure time values in order to determine an optimal exposure time for which the blurriness value determined by the method is low enough to allow acquiring a sharp still picture for example.

According to some embodiments, the method further comprises selecting the direction among the first and second directions on the basis of a predefined criterion.

A trajectory may be defined as the coordinates of the successive positions of frames or object displacements along time with respect to a reference frame/object position. Given that a video is not continuous but comprises a succession of frames separated by frame durations, an interpolation enables to obtain points of the inter-frame trajectory by constructing segments between points of two successive frames. This embodiment enables advantageously to determine a dominant direction of the trajectory, for example by considering the direction along which the trajectory contains the greatest number of points, or the one which contains the most distant trajectory points, or a mix of these two criteria. Thus, in some embodiments only the dominant direction is taken into account in the estimation of the blurriness value, which enables to obtain an accurate estimation with a simple calculation that does not have to consider both first and second directions.

In some embodiments of the invention, the method further comprises selecting the subset of frames among the series of frames, the sum of the inter-frame durations of each couple of frames of the subset being greater than or equal to the exposure time, the subset comprising the last acquired frame of the series of frames.

Such embodiments enable to perform the method only on a subset of frames that are representative to determine a blurriness effect after a given exposure time.

Indeed, such embodiments enable to ensure that all the frames that are representative to determine a blurriness value for a given exposure time are taken into account. Thus, it enables to obtain a blurriness value representative of a given exposure time, and also allows simplifying the determination of an optimal exposure time to acquire a sharp still picture.

In addition, the selected subset of consecutive frames may comprise the minimum number of consecutive frames enabling to exceed the exposure time by summing the frame durations respectively associated to the frames of the subset.

Thus, an optimal number of frames may be determined to process the method, which enables to conciliate accuracy of the blur estimation and quickness of the determination of the blurriness value.

According to some embodiments, the method further comprises a previous step of acquiring the series of at least two frames within a period of time greater than or equal to exposure time.

In some embodiments of the invention, the first direction and the second direction are respectively horizontal and vertical.

Indeed, calculations are typically simplified by projecting displacements according to orthogonal directions. Furthermore, frames are usually composed of a matrix of pixels that are oriented according to vertical and horizontal directions. Thus, the trajectory is defined with accuracy when horizontal and vertical directions are considered.

In some embodiments of the invention, the method further comprises:
  acquiring at least one new frame in the series of frame and determining the displacement values between the new frame and a last acquired frame of the series of frames, the new frame being added to the series of frames to obtain a new series of frames; and,
  determining first and second displacement values corresponding to a displacement according to a first direction and a second direction, between the last acquired frame of the series of frames and the new frame, the last acquired frame of the series of frames and the new frame forming a couple of frames of the new series;
  determining at least a new first blur measure for one direction among said first and second directions by calculating a metric based on the displacement values for each couple of frames of at least a subset of the new series; and
  determining a new blurriness value based on at least the new first blur measure.

Such embodiments propose to process the method iteratively. Thus it is possible to determine a new blurriness value when a new frame has been acquired. The steps of determining the first blur measure can also be repeated several times, by adding a new acquired frame at each time. For example, the method can be repeated a predetermined number N of times. Alternatively, the method can be repeated until the determined blurriness value respects a given criterion (is below a given threshold for example).

Furthermore, in some embodiments of the invention, the step of determining the new first blur measure for the new series of frames is processed on the basis of the first blur measure of the series of frames and on the basis of the displacement values between the new frame and the last acquired frame of the series of frames.

This embodiment can also be applied to the second blur measure when second blur measure is taken into account to determine the blurriness value, according to some embodiments of the invention.

Such embodiments enable to calculate metrics for the new series of frames by updating the metrics that have been determined for other series of frames associated to previous iterations, which allows saving time and simplifying estimation of the blurriness value.

In some embodiments of the invention, a two-dimensional base is defined by two non collinear vectors and an origin, the frames from the series of frames being composed of pixels that are associated with a first coordinate and a second coordinate, and each frame being located with a reference to a particular pixel. The frames are translated with regard to the two-dimensional base so that the particular pixel of the last acquired frame from the series of frames is placed on the origin of the two-dimensional base.

Such embodiments allow simplifying the calculation of the first blur measure insofar as the previously determined metric for the previous iteration is simply updated by a translation and completed by the application of the metric to a trajectory between the new frame and the last acquired frame, which have coordinates that have been simplified by the translation, the displacement values being weighted, in some embodiments, by a new frame duration between the new frame and the last acquired frame of the series of frames.

Such embodiments can also be applied to the second blur measure when second blur measure is taken into account to determine the blurriness value, according to some embodiments of the invention.

According to some embodiments, the displacement values are determined in video resolution and the method further comprises applying a scaling factor to the blurriness value to estimate a blur in photo resolution, the scaling factor being an increasing function of a photo and video resolution ratio.

Such embodiments allow obtaining a fine value to estimate the blur in a still picture, which is in photo resolution.

According to some embodiments, the method further comprises adjusting exposure time based on the determined blurriness value.

Such embodiments enable to progressively determine an optimal value of exposure time, which allows acquiring a sharp still picture.

Another aspect of the invention concerns a device for estimating a blurriness value based on a series of at least two frames acquired within a period of time greater than or equal to a given exposure time, the frames being grouped in at least one couple of frames, the device comprising:
- a motion adaptation unit adapted to determine for each couple of consecutive frames of the series, first and second displacement values corresponding to a displacement according to a first direction and a second direction, between the first frame and the second frame of a couple of frames; and
- a calculation unit adapted to determine a first blur measure for one direction among the first and second directions by calculating a metric applied to the displacement values for each couple of frames of at least a subset of the series, to determine a second blur measure for the other direction among the first and second directions by calculating a metric applied to the displacement values for each couple of frames of the series of frames and to determine a blurriness value based on at least the first and second blur measures.

The device can for example be a camera or a phone camera, comprising one or several units for acquiring the series of frames. The device may also be an intermediate product such as a micro-chip, a camera platform, a mobile platform, or a graphics processing system.

In some embodiments, the device further comprises a frame acquisition unit adapted to acquire the series of at least two frames within the period of time greater than the given exposure time.

In some embodiments, the device further comprises a timer unit adapted to associate an inter-frame duration to each couple of frames of the series, the inter-frame duration being defined by the interval of time between the acquisitions of a first frame and a second frame of the couple of frames and the displacement values for each couple of frames of at least the subset of the series of frames are weighted by the calculation unit in the metric by the inter-frame duration of the couple of frames to determine at least the first blur measure.

In some embodiments, the motion estimation unit is adapted to determine the displacement values in video resolution and the calculation unit is adapted to apply a scaling factor to the blurriness value to estimate a blur in photo resolution, the scaling factor being an increasing function of a photo and video resolution ratio.

In some embodiments, the device further comprises:
- a decision unit adapted to take a decision to acquire a picture (at the acceptable blur limit) based on the determined blurriness value;
- a picture acquisition unit adapted to acquire the picture depending on the decision.

Thus, the device may comprise a decision unit which is adapted to decide an optimal time to acquire a sharp still picture, based on a given criterion for example. In some embodiments, the decision unit is adapted to decide if the blurriness value is low enough to obtain a sharp still picture by comparing the determined blurriness value to a threshold. The criterion can for example be predefined by a user of the device.

In some embodiments, the picture acquisition unit is also adapted to acquire the series of at least two frames within the period of time greater than the given exposure time.

Thus, a common unit may be used to acquire the series of frames and to acquire the still picture. Consequently, this embodiment enables to reduce costs associated with the device. The series of frames can to this end be acquired previously to the still picture, as a preview for example.

In some embodiments of the invention, the device further comprises an adjustment unit adapted to adjust exposure time based on the determined blurriness value.

Such embodiments enable to progressively determine an optimal value of exposure time, which allows acquiring a sharp still picture. Alternatively or additionally, the device may be adapted to determine the sharpest still picture in a series of still pictures, which have been acquired in burst mode for example, by determining which still picture is associated with the lowest blurriness value.

Still another aspect of the invention concerns a product comprising a computer readable medium having stored thereon computer program instructions loadable into a computing device and adapted to—when loaded into and executed by said computed device—cause the computing device to perform a method according to anyone of the embodiments of the first aspect of the invention.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

It should be noted that embodiments of the invention are applicable to pictures/frames in general (e.g. photos, still pictures, components of a video, frames of a video sequence, pictures of a still picture burst, etc.) and in any combination even though described herein with reference to a particular example (e.g. estimating blur from at least two frames of a video sequence or picture burst and applying the result to a still picture which is not one of the frames used for estimation). For example, result of the blur estimation may be applied to a still picture or to a frame of a video sequence, and it can be applied to a picture that is or is not one of the frames used for estimation. The picture that the result is applied to may be acquired after or during the acquisition of the frames used for estimation and by the same or a different acquisition unit using the same or different resolution.

Figure 1:
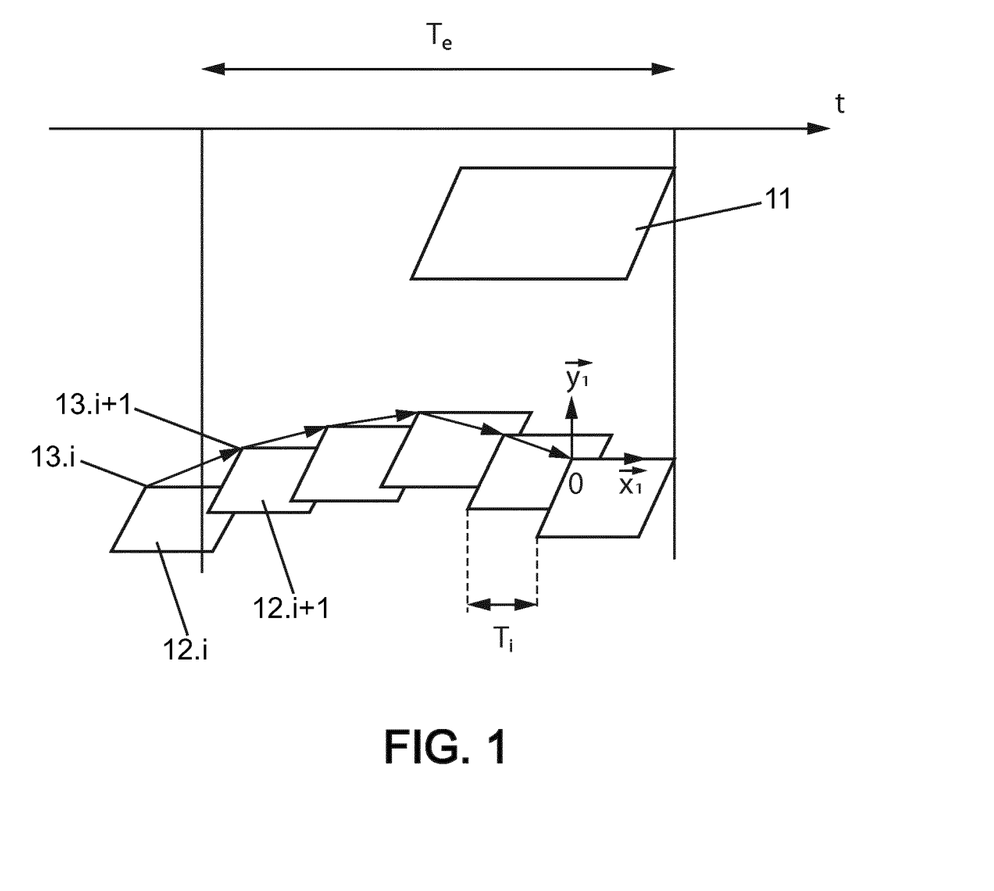
FIG. 1 illustrates a temporal diagram describing an acquisition of frames by a device according to some embodiments of the invention.

FIG. 1 illustrates a temporal diagram describing an acquisition of frames and an acquisition of a still picture by a device comprising two cameras according to some embodiments of the invention. No restriction is attached to the number of cameras that are comprised in the device. For example, in another embodiment of the invention, the frames and the still picture are acquired by a single camera of the device.

A first camera of the device is adapted to acquire a still picture 11. To this purpose, a zoom shutter of the first camera can be opened during a predefined exposure time $T_e$. In the example described herein, exposure time $T_e$ is prefixed. However, exposure time $T_e$ can be a parameter, in order to determine an optimal exposure time $T_e$ to acquire a sharp still picture 11 (reaching the acceptable blur limit). A user of the device can, for example, instantly visualize on a screen the still picture 11 before its acquisition. In parallel to the acquisition of still picture 11, a second camera can be adapted to acquire a series of k frames 12.$i$, i varying between 1 and k, the frames being grouped in couples of frames 12.$i$,12.$i$+1, each couple of frames 12.$i$,12.$i$+1 being temporally spaced by an inter-frame duration $T_i$, which can be variable. In this example, the plurality of frames contains k frames, k being greater than or equal to two and the couples of frames can be composed of consecutive frames. However, in some embodiments, non-consecutive frames can be chosen to form the different couples of frames. The series of frames 12.1-12.$k$ can be determined so that trajectory duration $T_{traj}$ obtained by summing the inter-frame durations $T_i$ is greater than or equal to exposure time $T_e$. For example, the series of frames 12.1-12.$k$ can be the smallest subset of L frames acquired by the second camera, the subset comprising for example the L last consecutive frames 12.($k$-L+1)-12.$k$ and the sum of inter-frame durations $T_i$, with i varying between k-L+1 and k, being greater than or equal to exposure time $T_e$.

In parallel to the determination of L and based on the acquired series of frames 12.1-12.$k$, a trajectory is determined, by jitter extraction for example. The determination of the trajectory includes obtaining a first and a second displacement values, respectively according to a first and a second directions, between two frames of a couple 12.$i$,12.$i$+1, i varying between 1 and k-1. The trajectory can, for example, be obtained by linear interpolation between successive positions of summits 13.$i$ of frames 12.$i$. The trajectory can represent the global motion between frames or a local motion of an object in the different frames of the series. Instead of summits, some other appropriate points of the frames may be used. For example, for local motion trajectory, a point related to the object in question may be appropriate.

In the example represented on FIG. 1, the displacements relative to summits 13.$i$ of frames 12.$i$ are considered and the frames are composed of a matrix of pixels. Furthermore, a two-dimensional base (O, $\vec{x}_1$, $\vec{y}_1$) can be considered in order to define two coordinates (x, y) for pixels corresponding to summits 13.$i$ and for each pixel belonging to the trajectory and thus for the segments between the summits of couple of frames 12.$i$, 12.$i$+1. Thus, for each couple of frames 12.$i$, 12.$i$+1, a horizontal displacement value $ds_x(i, i+1)$ and a vertical displacement value $ds_y(i,i+1)$ are obtained corresponding respectively to the differences between the abscissas of summits 13.$i$+1 and 13.$i$ and the ordinates of summits 13.$i$+1 and 13.$i$, i varying between 1 and k-1. In some embodiments of the invention, a unique translation is applied to each frame 12.$i$ so that the coordinates of summit 13.$k$ of the last acquired frame 12.$k$ are (0, 0). The trajectory can also be determined for the L last acquired frames 12.($k$-L+1)-12.$k$, thus avoiding to determine displacement values that are not used by the method according to some embodiments of the invention.

In the case where the method is processed iteratively, the second camera is adapted to acquire a new frame and to add the new frame to the series of frames 12.1-12.$k$, thus creating a new series of frames 12.1-12.$k$+1, comprising k+1 frames. The same steps of the method can then be processed to select a new subset of frames and to determine a blurriness value according to the method illustrated on FIG. 2. The method can be processed again for different exposure times $T_e$, thus determining an optimal exposure time $T_e$ value that enables to obtain an optimal blurriness value for the acquisition of a sharp still picture. The method can also enable to determine the sharpest still picture in a series of still picture acquired by the first camera.

In the case where the device comprises a single camera, frames 12.$i$ are typically acquired previously to the beginning of a time interval corresponding to the exposure time $T_e$. For example, frames 12.$i$ can be all the frames that have been acquired before still image 11. A high frame rate for example reduces the inter-frame duration of the couple of frames and thus increases the accuracy of blur estimation.

Figure 2:
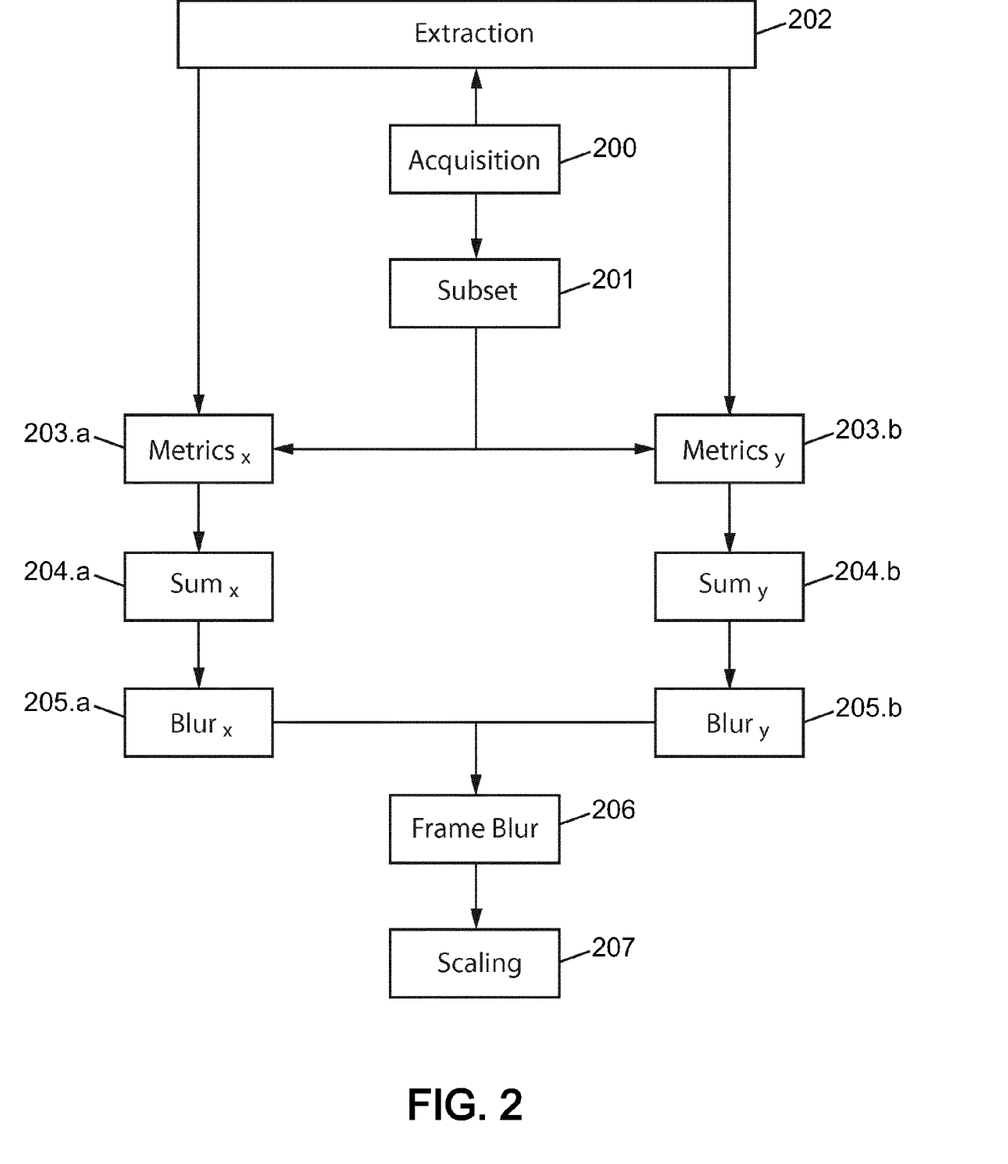
FIG. 2 illustrates a flowchart of the method according to some embodiments of the invention.

FIG. 2 illustrates a flowchart of the method according to some embodiments of the invention.

References detailed on FIG. 1 are also used hereafter.

Exposure time $T_e$ can be prefixed, by a user for example, or automatically by the device. Exposure time $T_e$ can also be considered as a parameter in order to determine an exposure time $T_e$ that enables to obtain an optimal blurriness value for the acquisition of still picture 11.

At step 200, an acquisition unit, such as the first camera of the device, can acquire the series of k frames 12.1-12.$k$. The device can be adapted to acquire still picture 11 in parallel with another acquisition unit, such as the second camera for example, or after the acquisition of the series of frames 12.1-12.$k$ with the same camera, according to some embodiments previously described. An inter-frame duration $T_i$ is also determined by a timer unit, such as a clock of the device for example, for each couple of frames 12.$i$, 12.$i$+1 that has been acquired by the device.

At step 201, a subset of frames among the acquired frames 12.$i$ is determined based on predetermined exposure time $T_e$ and the inter-frame durations $T_i$ of the couples of frames 12.$i$, 12.$i$+1, i varying between 1 and k−1, the frames of the subset being consecutive for example. The subset can also comprise a number L of frames, L being an integer. Furthermore, the subset can for example comprise the L last acquired frames 12.($k$−L+1)-12.$k$ of the series of frames 12.1-12.$k$. Integer L can for example correspond to the smallest integer for which:

$$T_e \leq \sum_{i=k-L+1}^{k} T_i$$

Trajectory duration $T_{traj}$ can be defined by:

$$T_{traj} = \sum_{i=k-L+1}^{k} T_i$$

In parallel to steps 200 and 201, at step 202, displacement values $ds_x(i, i+1)$ and $ds_y(i, i+1)$ are determined for each couple of frames that have been previously acquired and the trajectory between the summits 13.1-13.$k$ of frames 12.1-12.$k$ is determined for example by considering a uniform motion between each couple of frames 12.$i$-12.$i$+1, and thus by interpolating the coordinates of e.g. summits 13.$i$. The displacement values can whether refer to a global motion between frames of a couple, due to a displacement of the user of a phone camera for example, or refer to a local object motion between frames of a couple of frames. Step 202 can also be performed by jitter extraction, and the trajectory can be computed in video frame resolution. Alternatively, step 202 can also be performed after steps 200 and 201 and can also take into account number L to determine only displacement values that are relative to the frames 12.($k$−L+1)-12.$k$ belonging to the subset.

Then, a first blur measure and a second blur measure can be obtained by calculating a metric. It is noted that, in some embodiments, a single blur measure suffices. To this end, the metric can take into account inter-frame trajectory, which can be considered as segments joining the summits 13.($k$−L+1)-13.$k$ of the frames 12.($k$−L+1)-12.$k$ belonging to the subset (or a particular summit of an object, in the case where a local motion vector is determined), and the inter-frame duration $T_i$ associated with each couple 12.$i$,12.$i$+1 of the subset. The metric enables to determine a blur measure for a given direction among two non collinear directions, for example the horizontal and the vertical directions. For example, the first blur measure can correspond to a horizontal blur measure Bl_meas_$x(T_e,k)$ that can be obtained by taking into account each pixel of the trajectory, which coordinates can be obtained by a linear interpolation between the summits 13.$i$, 13.$i$+1 of each couple of frames 12.$i$,12.$i$+1 of the subset. Then, the horizontal blur measure Bl_meas_$x(T_e,k)$ defined as the standard deviation of pixel abscissa of the trajectory, which may correspond to the camera motion that occurs during $T_e$ prior to the acquisition of frame 12.$k$+1, i.e. at the end of the acquisition of frame 12.$k$ (and which consequently corresponds to the blur measure), can be calculated at steps 203.$a$, 204.$a$, 205.$a$ by:

$$\text{Bl\_meas\_}x(T_e,k)=(E(x^2)-E(x)^2)^{0.5}$$

where abscissas weighted sum $E(x)$ and squared abscissas weighted sum $E(x^2)$ can be defined by:

$$E(x) = \frac{\sum_{x_j \in Trajectory} x_j t(x_j)}{T_{traj}}$$

$$E(x^2) = \frac{\sum_{x_j \in Trajectory} x_j^2 t(x_j)}{T_{traj}}$$

where $t(x_j)$ can be given by:

$$t(x_j) = \sum_{y_k/(x_j,y_k) \in trajectory} t(x_j, y_k)$$

where $t(x_j,y_k)$ is a Point Spread Function (PSF) value (or an impulse response value) at pixel $(x_j,y_k)$ of the blur generated during exposure time $T_e$ at the end of acquisition of frame 12.$k$, the pixel $(x_j,y_k)$ belonging to the trajectory, which is a plurality of segments in this example, between frames of the subset. It is noted that in the previous expression of $t(x_j)$ the abscissa $x_j$ is fixed and $t(x_j)$ is calculated for the pixels $(x_j, y_k)$, which belongs to the trajectory.

For the vertical direction, a second blur measure Bl_meas_$y(T_e,k)$ is obtained at steps 203.$b$, 204.$b$, 205.$b$ in a similar way:

$$\text{Bl\_meas\_}y(T_e,k)=(E(y^2)-E(y)^2)^{0.5}$$

where ordinates weighted sum $E(y)$ and squared ordinates weighted sum $E(y^2)$ can be defined by:

$$E(y) = \frac{\sum_{y_j \in Trajectory} y_j t(y_j)}{T_{traj}}$$

$$E(y^2) = \frac{\sum_{y_j \in Trajectory} y_j^2 t(y_j)}{T_{traj}}$$

where $t(y_j)$ can be given by:

$$t(y_j) = \sum_{x_k/(x_k,y_j) \in trajectory} t(x_k, y_j)$$

where $t(x_k, y_j)$ is a Point Spread Function (PSF) value (or an impulse response value) at pixel $(x_k, y_j)$ of the blur generated during exposure time $T_e$ at the end of acquisition of frame 12.$k$, the pixel $(x_k,y_j)$ belonging to the trajectory, which is a plurality of segments in this example, between frames of the subset. It is noted that in the previous expression of $t(y)$ the ordinate $y_j$ is fixed and $t(y_j)$ is calculated for the pixels $(x_k,y_j)$, which belongs to the trajectory.

A method for executing steps 203.$a$, 204.$a$, 205.$a$ and thus determining the horizontal blur measure Bl_meas_$x(T_e,k)$ is now described.

For each couple of frames 12.$i$-12.$i$+1 from the subset of frames, i varying between k−L+1 and k−1, an abscissas weighted average $S1_x(i,i-1)$ and a squared abscissas weighted average $S2_x(i,i-1)$ can be determined at step 203.$a$.

Indeed, it can be shown that for the last couple of frames, which comprises frame 12.$k$ and frame 12.$k$−1, horizontal displacement $ds_x(k,k-1)$ and vertical displacement $ds_y(k,k-$ 1) being defined, summit 13.$k$ having two coordinates (0, 0) in the two-dimensional base, the following results are obtained:

$$S1_x(k,k-1)=-T_k ds_x(k,k-1)/2$$

where $T_k$ is the inter-frame duration of the couple of frames 12.$k$, 12.$k-1$ and $$S2_x(k, k-1) = \begin{cases} 0 & \text{if } ds_x(k, k-1) = 0 \\ T_k(2ds_x(k, k-1)^2 + 1) & \text{otherwise} \end{cases}.$$

If L is equal to or greater than 3, if the method is applied iteratively and has been applied during the previous iteration to a previous series of frames comprising the frames 12.1-12.($k-1$), the sums $S1_x(i,i-1)$ and $S2_x(i,i-1)$ can be obtained at step 203.$a$ for the other segments 13.($i-1$)-13.$i$ of the trajectory, i varying between k−L+2 and k−1, by updating sums $S1'_x(i,i-1)$ and $S2'_x(i,i-1)$, i varying between 2 and k−1, which have been previously obtained within the previous iteration. Thus, sums $S1_x(i,i-1)$ and $S2_x(i,i-1)$ can be given by:

$$S1_x(i,i-1)=S1'_x(i,i-1)-T_i ds_x(k,k-1)/2$$

$$S2_x(i,i-1)=S2'_x(i,i-1)-ds_x(k,k-1)\cdot(-T_i ds_x(k,k-1)+2S1'_x(i,i-1))$$

The update is due to the translation of trajectory between frames 12.($k-1$) and 12.$k$ by ($-ds_x(k,k-1), -ds_y(k,k-1)$), so as coordinates of summit 13.$k$ correspond to (0,0). Then, summit 13.$k$ corresponds to origin O.

Abscissa weighted sum E(x) and squared abscissa weighted sum E($x^2$) can then be obtained at step 204.$a$ by:

$$E(x) = \frac{\sum_{i=k-L+1}^{k} S1_x(i, i-1)}{T_{traj}}$$

$$E(x^2) = \frac{\sum_{i=k-L+1}^{k} S2_x(i, i-1)}{T_{traj}}$$

The horizontal blur measure Bl_meas_$x(T_e,k)$ is then given at step 205.$a$ by:

$$\text{Bl\_meas\_}x(T_e,k)=(E(x^2)-E(x)^2)^{0.5}$$

A method for executing steps 203.$b$, 204.$b$, 205.$b$ and thus calculating the vertical blur measure Bl_meas_$y(T_e,k)$ is now described.

For each couple of frames 12.$i$,12.($i-1$) from the subset of frames, an ordinate weighted average $S1_Y(i,i-1)$ and a squared ordinate weighted average $S2_Y(i,i-1)$ can be determined at step 203.$b$.

Indeed, it can be shown that for the last couple comprising frame 12.$k$ and frame 12.$k-1$ and by defining horizontal displacement value $ds_x(k,k-1)$ and vertical displacement value $ds_y(k,k-1)$, summit 13.$k$ having two coordinates (0,0) in the two-dimensional base, the following results are obtained:

$$S1_Y(k,k-1)=-T_k ds_Y(k,k-1)/2$$

where $T_k$ is the inter-frame duration of the couple of frames 12.$k$, 12$k-1$, and $$S2_Y(k, k-1) = \begin{cases} 0 & \text{if } ds_Y(k, k-1) = 0 \\ T_k(2ds_Y(k, k-1)^2 + 1) & \text{otherwise} \end{cases}.$$

If L is equal to or greater than 3, if the method is applied iteratively and has been applied during the previous iteration to a series of frames comprising the frames 12.1-12.($k-1$), the sums $S1_Y(i,i-1)$ and $S2_Y(i,i-1)$ can be obtained at step 203.$b$ for the other segments 13.($i-1$)-13.$i$ of the trajectory, i varying between k−L+2 and k−1, by updating sums $S1'_Y(i,i-1)$ and $S2'_Y(i,i-1)$, based on a previous subset of frames corresponding to a previous iteration of the method. Thus, sums $S1_Y(i,i-1)$ and $S2_Y(i,i-1)$ can be given by:

$$S1_Y(i,i-1)=S1'_Y(i,i-1)-T_i ds_y(k,k-1)/2$$

$$S2_Y(i,i-1)=S2'_Y(i,i-1)-ds_Y(k,k-1)\cdot(-T_i ds_Y(k,k-1)+2S1'_Y(i,i-1))$$

The update is due to the translation of trajectory between frames 12.($k-1$) and 12.$k$ by ($-ds_x(k,k-1), -ds_y(k,k-1)$), so as coordinates of summit 13.$k$ correspond to (0,0). Then, summit 13.$k$ corresponds to origin O.

Ordinate weighted sum E(y) and squared ordinate weighted sum E($y^2$) can then be obtained at step 204.$b$ by:

$$E(y) = \frac{\sum_{i=k-L+1}^{k} S1_Y(i, i-1)}{T_{traj}}$$

$$E(y^2) = \frac{\sum_{i=k-L+1}^{k} S2_Y(i, i-1)}{T_{traj}}$$

The vertical blur measure Bl_meas_$y(T_e,k)$ is then given at step 205.$b$ by:

$$\text{Bl\_meas\_}y(T_e,k)=(E(y^2)-E(y)^2)^{0.5}$$

Finally, a blurriness value Bl_meas($T_e,k$) can be computed at a step 206 on the basis of the determined horizontal and vertical blur measures. For example, the blurriness value Bl_meas($T_e,k$) can be chosen as being the greatest among the horizontal and vertical blur measures:

$$\text{Bl\_meas}(T_E,k)=\max(\text{Bl\_meas\_}x(T_e,k),\text{Bl\_meas\_}y(T_e,k))$$

Alternatively, the blurriness value can be chosen as being the average of the horizontal and vertical blur measures or as a weighted sum of the maximum value and the average value.

At step 207, a scaling factor can be applied to blurriness Bl_meas($T_e,k$) value to estimate a blur in photo resolution, which is an increasing function of a photo and video resolutions ratio. In another embodiment, the scaling factor can also be applied directly on each camera displacement or on the result of the blur measures.

If inter-frame duration $T_k$ of the last acquired couple of frames 12.$k$, 12.$k-1$ is greater than exposure time $T_e$, the trajectory is made of only one segment 13.($k-1$)-13.$k$. In this case, the blurriness value Bl_meas($T_e,k$) can be obtained by computing the method for $T_e=T_k$ and applying a proportionality rule as:

$$BI\_meas(T_e, k) = BI\_meas(T_k, k)\frac{T_e}{T_k}$$

For $T_e = T_k$, it can be shown that $Bl\_meas\_x(T_e,k)$ and $Bl\_meas\_y(T_e,k)$ can be given respectively by:

$$BI\_meas\_x(T_k, k) = \begin{cases} 0 & \text{if } ds_x(k, k-1) = 0 \\ \frac{1}{2}((ds_x(k, k-1)^2 + 2)/3)^{1/2} & \text{otherwise} \end{cases}$$

$$BI\_meas\_y(T_k, k) = \begin{cases} 0 & \text{if } ds_y(k, k-1) = 0 \\ \frac{1}{2}((ds_y(k, k-1)^2 + 2)/3)^{1/2} & \text{otherwise} \end{cases}$$

Furthermore, the method according to the invention can be applied to a series of fractions of frames to detect the motion of a particular object in a series of frames for example, and to determine the blurriness value generated thereby.

Alternatively, the method can enable to estimate the blurriness value of different still pictures, in a burst mode for example, in order to determine the still picture associated with the lowest blurriness value, which is also the sharpest still picture.

The method can be implemented by using one or at least two cameras. In the latter case, one camera being dedicated to acquiring the still picture and the other camera being adapted to acquire the series of frames used to calculate the blurriness value of the still picture.

Figure 3:
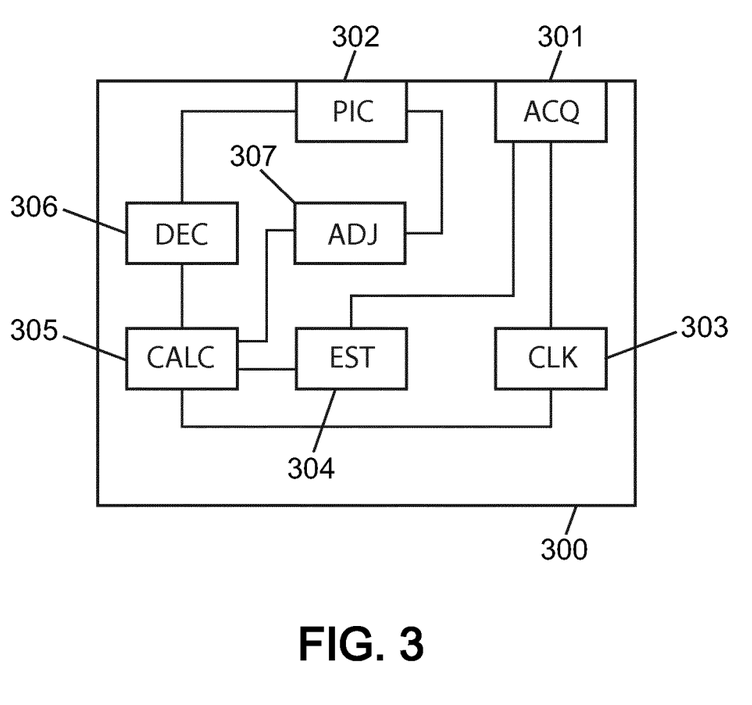
FIG. 3 illustrates a device according to some embodiments of the invention.

Referring to FIG. 3, there is shown therein a device 300 according to some embodiments of the invention. The device 300 can, for example, be a mobile phone, a camera, a microchip, a camera platform, a mobile platform or a graphic processing arrangement. The device 300 comprises a frame acquisition unit 301 adapted to acquire a series of frames within a period of time greater than a given exposure time $T_e$, the frames being then grouped into couples of frames comprising a first and a second frames. The frame acquisition unit 301 can be, for example, a camera.

The device 300 comprises a still picture acquisition unit 302 adapted to acquire a still image, upon a request of a user of the device 300 for example. To this end, still picture acquisition unit 302 can be a camera.

In some embodiments, one or more of the acquisition units 301, 302 are not part of the device, but the device is connectable to one or more such external acquisition units.

The frame acquisition unit 301 can be connected to a timer unit 303, such as a clock for example, adapted to associate an inter-frame duration to each couple of frames that is acquired by the frame acquisition unit 301.

The frame acquisition unit 301 is also connected to a motion estimation unit 304 adapted to determine, for each couple of frames, a first value and a second value corresponding to a displacement according to a first direction and a second direction, between the first frame and the second frame of a couple of frames.

The motion estimation unit 304 and the timer unit 303 are connected to a calculation unit 305 adapted to determine a first blur measure for one direction among the first and second directions by calculating a metric applied to the displacement values for each couple of frames of a subset of frames of the series and adapted to determine a blurriness value based on the first blur measure. The calculation unit 305 can also determine a second blur measure for the other direction and then determine the blurriness value on the basis of both first and second blur measures. The calculation unit 305 can take into account the inter-frame duration of each couple of frames of the subset to determine the first and second blur measures.

The calculation unit 305 is connected to a decision unit 306 adapted to take a decision to acquire a still picture based on the determined blurriness value. To this end, the calculation unit 305 is connected to the still picture acquisition unit 302, which may acquire a still picture based on the decision of the decision unit 306.

The calculation unit 305 can also be connected to an adjustment unit 307 adapted to adjust exposure time $T_e$ based on the determined blurriness value. The adjustment unit 307 enables to determine an optimal exposure time value to acquire a sharp still picture. To this end, the adjustment is connected to the still picture acquisition unit 302.

In some embodiments, the device 300 can comprise a single unit instead of still picture acquisition unit 302 and frame acquisition unit 301. This single unit can be adapted to acquire the frames and to acquire the still picture when the determined blurriness value is sufficient to obtain a satisfying sharpness of the still picture.

It is stipulated that the reference signs in the claims do not limit the scope of the claims, but are merely inserted to enhance the legibility of the claims.

The invention claimed is:

1. A method for estimating a blurriness value, comprising acquiring a series of at least two frames within a period of time greater than a given exposure time to be used for acquisition of a still picture being distinct from the at least two frames;
grouping said at least two frames in at least one couple of frames;
determining, for each of the at least one couple of frames of the series, first and second displacement values corresponding to a displacement according to a first direction and a second direction, between a first frame and a second frame of a couple of frames;
determining a first blur measure for one direction among said first and second directions by calculating a metric based on the first and second displacement values for each of the at least one couple of frames of at least a subset of said series;
determining a second blur measure for the other direction among the first and second directions by calculating a metric applied to said first and second displacement values for each of the at least one couple of frames of the series of frames; and
determining a blurriness value based on said first and second blur measures.

2. The method according to claim 1, wherein the blurriness value is determined as being one of:
a greatest value among the first blur measure and the second blur measure;
an average value of the first blur measure and the second blur measure;
a weighted average value of the first blur measure and the second blur measure; and
a weighted sum of a greatest value among the first blur measure and the second blur measure and an average value of the first blur measure and the second blur measure.

3. The method according to claim 1, wherein an inter-frame duration being associated to each of the at least one couple of frames of the series, the inter-frame duration being defined by the interval of time between the acquisitions of a first frame and a second frame of the couple of frames, the first and second displacement values for each of the at least one couple of frames of at least the subset of the series of frames are weighted in the metric by the inter-frame duration of the couple of frames to determine at least the first blur measure.

4. The method according to claim 3, further comprising selecting the subset of frames among the series of frames, the sum of the inter-frame durations of each of the at least one couple of frames of the subset being greater than or equal to the exposure time, said subset comprising the last acquired frame of the series of frames.

5. The method according to claim 1, further comprising:
acquiring at least one new frame in the series of frames and
determining the first and second displacement values between said new frame and a last acquired frame of the series of frames, said new frame being added to the series of frames to obtain a new series of frames;
determining, first and second displacement values corresponding to a displacement according to a first direction and a second direction, between the last acquired frame of the series of frames and the new frame, said last acquired frame of the series of frames and said new frame forming a couple of frames of the new series;
determining at least a new first blur measure for one direction among said first and second directions by calculating a metric based on the first and second displacement values for each couple of frames of at least a subset of said new series; and
determining a new blurriness value based on at least said new first blur measure.

6. The method according to claim 5, wherein step of determining the new first blur measure for the new series of frames is processed on the basis of the first blur measure of the series of frames and on the basis of the first and second displacement values between said new frame and the last acquired frame of the series of frames.

7. The method according to claim 1, wherein the first and second displacement values are determined in video resolution, the method further comprising applying a scaling factor to the blurriness value to estimate a blur in photo resolution, said scaling factor being an increasing function of a photo and video resolution ratio.

8. A device for estimating a blurriness value, comprising:
a frame acquisition unit adapted to acquire a series of at least two frames within a period of time greater than or equal to a given exposure time to be used for the acquisition of a still picture being distinct from the at least two frames, said frames being grouped in at least one couple of frames;
a motion estimation unit adapted to determine for each of the at least one couple of frames of the series, first and second displacement values corresponding to a displacement according to a first direction and a second direction, between a first frame and a second frame of a couple of frames; and
a calculation unit adapted to determine a first blur measure for one direction among said first and second directions by calculating a metric applied to the first and second displacement values for each of the at least one couple of frames of at least a subset of said series, to determine a second blur measure for the other direction among the first and second directions by calculating a metric applied to said first and second displacement values for each of the at least one couple of frames of the series of frames and to determine a blurriness value based on said first and second blur measures.

9. The device according to claim 8, further comprising a timer unit adapted to associate an inter-frame duration to each of the at least one couple of frames of the series, the inter-frame duration being defined by the interval of time between the acquisitions of a first frame and a second frame of the couple of frames and wherein the first and second displacement values for each of the at least one couple of frames of at least the subset of the series of frames are weighted by the calculation unit in the metric by the inter-frame duration of the couple of frames to determine at least the first blur measure.

10. The device according to claim 8, wherein the motion estimation unit is adapted to determine the first and second displacement values in video resolution and the calculation unit is adapted to apply a scaling factor to the blurriness value to estimate a blur in photo resolution, said scaling factor being an increasing function of a photo and video resolutions ratio.

11. The device according to claim 8, further comprising:
a decision unit adapted to take a decision to acquire a picture based on the determined blurriness value;
a picture acquisition unit adapted to acquire said picture depending on said decision.

12. The device according to claim 11, wherein the picture acquisition unit is also adapted to acquire the series of at least two frames within the period of time greater than or equal to the given exposure time.

13. A non-transitory computer readable storage medium, with a program stored thereon, said program comprising instructions for the implementation of the method according to claim 1.

14. A method for estimating a blurriness value based on a series of at least two frames acquired within a period of time greater than or equal to a given exposure time, said frames being grouped in at least one couple of frames, wherein the method comprises:
determining, for each of the at least one couple of frames of the series, first and second displacement values corresponding to a displacement according to a first direction and a second direction, between a first frame and a second frame of a couple of frames;
determining a first blur measure for one direction among said first and second directions by calculating a metric based on the first and second displacement values for each of the at least one couple of frames of at least a subset of said series;
determining a second blur measure for the other direction among the first and second directions by calculating a metric applied to said first and second displacement values for each of the at least one couple of frames of the series of frames; and
determining a blurriness value based on said first and second blur measures;
taking a decision to acquire a picture based on the determined blurriness value;
acquiring said picture depending on said decision.

15. A device for estimating a blurriness value based on a series of at least two frames acquired within a period of time greater than or equal to a given exposure time, said frames being grouped in at least one couple of frames, wherein the device comprises:
a motion estimation unit adapted to determine for each of the at least one couple of frames of the series, first and second displacement values corresponding to a displacement according to a first direction and a second direction, between a first frame and a second frame of a couple of frames;

a calculation unit adapted to determine a first blur measure for one direction among said first and second directions by calculating a metric applied to the first and second displacement values for each of the at least one couple of frames of at least a subset of said series, to determine a second blur measure for the other direction among the first and second directions by calculating a metric applied to said first and second displacement values for each of the at least one couple of frames of the series of frames and to determine a blurriness value based on said first and second blur measures;

a decision unit adapted to take a decision to acquire a picture based on the determined blurriness value; and a picture acquisition unit adapted to acquire said picture depending on said decision.

* * * * *